US008291027B2

(12) United States Patent
McAleer et al.

(10) Patent No.: US 8,291,027 B2
(45) Date of Patent: Oct. 16, 2012

(54) METHOD AND NETWORK NODE FOR UPLOADING MEDIA CONTENT FROM A USER DEVICE TO AT LEAST ONE NETWORK ENTITY

(75) Inventors: David McAleer, Montreal (CA); Constant Wette Tchouati, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 344 days.

(21) Appl. No.: 12/626,250

(22) Filed: Nov. 25, 2009

(65) Prior Publication Data

US 2011/0125723 A1     May 26, 2011

(51) Int. Cl.
*G06F 15/16* (2006.01)
*H04M 3/42* (2006.01)
*H04W 4/00* (2009.01)

(52) U.S. Cl. ..... 709/206; 709/204; 709/227; 455/414.1; 455/466

(58) Field of Classification Search .................. 709/206, 709/227
See application file for complete search history.

(56) References Cited

U.S. PATENT DOCUMENTS

| | | | |
|---|---|---|---|
| 2009/0150488 A1* | 6/2009 | Martin-Cocher et al. | 709/204 |
| 2009/0181653 A1* | 7/2009 | Alharayeri | 455/414.1 |
| 2009/0221307 A1* | 9/2009 | Wolak et al. | 455/466 |
| 2010/0100596 A1* | 4/2010 | Strandell et al. | 709/206 |

FOREIGN PATENT DOCUMENTS
WO    2007/031708 A1    3/2007

OTHER PUBLICATIONS abbas: "Zyb phonebook released I love it . . . you will too . . . "; XP002624828, Aug. 7, 2007. Retrieved from Internet; 2 pages.
International Search Report for PCT/IB2010/055314 dated Mar. 10, 2011; 10 pages.

* cited by examiner

*Primary Examiner* — Wing Chan
*Assistant Examiner* — David X Yi
(74) *Attorney, Agent, or Firm* — David J. Rahmer; Ericsson Canada Inc.

(57) ABSTRACT

The invention relates to a method and network node for uploading media content from a user device to at least one network entity. The method comprises the step of associating a code with the at least one network entity, in a network node. The method further comprises the step of sending an address book object from the network node to the user device, said address book object comprising the code and said address book object being usable for sending a multimedia message to the network node from the user device. The method further comprise the step of receiving, in the network node, the multimedia message from the user device, said multimedia message containing the code and the media content. The method further comprise the step of updating, from the network node, the at least one network entity associated with the code with the media content.

10 Claims, 4 Drawing Sheets

METHOD AND NETWORK NODE FOR UPLOADING MEDIA CONTENT FROM A USER DEVICE TO AT LEAST ONE NETWORK ENTITY

TECHNICAL FIELD

The present invention relates to the fields of multimedia, telecommunications and information technologies.

BACKGROUND

Network entities such as social networks are gaining in popularity very rapidly. They provide users with the ability to update status/activity information e.g. "drinking coffee at Starbucks®", to upload and share photos/video/audio content, to connect with friends, to see friends photos/video/audio content, to see friends activities or to organize parties or reunions, etc.

Currently, most social networking sites allow for content to be uploaded via a Hypertext Transfer Protocol (HTTP) interface. Some clients, which are specific to a particular social network, also exist for user devices such as computers or cell phones. Furthermore, some social networks, such as Twitter®, allow users to update their status or share a comment by sending a Short Message Service (SMS) to a specified short code.

However, these solutions are not convenient when a user wants to update his status on many social networks. Indeed, the user currently has to connect to each of these social networks separately, using more or less user friendly interfaces. Thus there is a need for a more convenient way to upload media content, such as a status, a picture, a comment, etc., from a user device to at least one network entity, such as a social network.

SUMMARY

It is therefore a general object of this invention to provide a method and network node for overcoming at least some of the prior art drawbacks.

According to an aspect of the invention, a method for uploading media content from a user device to at least one network entity is provided. The method comprises the step of associating a code with the at least one network entity, in a network node. The method further comprises the step of sending an address book object from the network node to the user device, said address book object comprising the code and said address book object being usable for sending a multimedia message to the network node from the user device. The method further comprises the step of receiving, in the network node, the multimedia message from the user device, said multimedia message containing the code and the media content. The method further comprise the step of updating, from the network node, the at least one network entity associated with the code with the media content.

According to another aspect of the invention, a network node for uploading media content from a user device to at least one network entity is provided. The network node comprises a processor for associating a code with the at least one network entity. The network node further comprises a sending interface, in communication with the user device, for sending an address book object to the user device, said address book object comprising the code. The network node further comprises a receiving interface, in communication with the user device, for receiving a multimedia message from the user device, wherein the multimedia message is sent using the address book object and wherein the multimedia message contains the code and the media content. The processor of the network node further updates, through the receiving and sending interfaces, the at least one network entity associated with the code with the media content.

BRIEF DESCRIPTION OF THE DRAWINGS

The objects and advantages of the invention will be understood by reading the detailed description in conjunction with the figures, wherein.

DETAILED DESCRIPTION

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

The embodiments according to the present invention are described with reference to block diagrams and/or operational illustrations of methods, network nodes, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Thus, the various aspects of the invention may be embodied in many different forms, and all such forms are contemplated to be within the scope of the invention. The computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Furthermore, in some illustrations, some blocks may be optional and may or may not be executed; these are generally illustrated with dashed lines.

Figure 1:
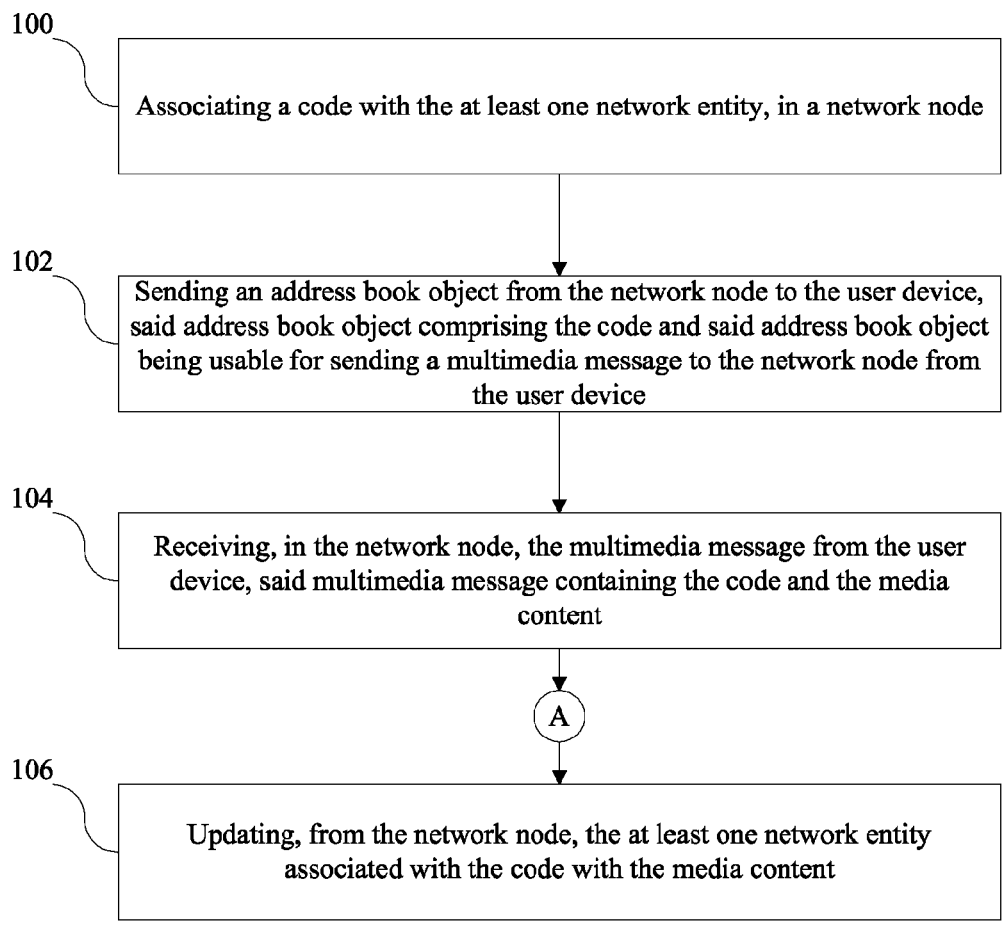
FIG. 1 is a flowchart illustrating an exemplary method according to the invention.

FIG. 1 illustrates a flowchart of a method for uploading media content from a user device to at least one network entity. The method comprises the step of associating a code with the at least one network entity, in a network node, step 100. In order to do so, a user may connect to a target social networking site and log in to authorize an application or a service to perform uploads on their behalf. For example, an application embodying at least part of this invention and executing in a user device may provide a way to connect to a target social networking site where the user then logs in and authorizes the application to perform uploads on their behalf. Once a user creates a connection to each of their Social Networking sites e.g. Facebook®, Flickr®, Youtube®, etc, he can create a channel. A channel is a list of at least one network entity e.g. a list of target social networking sites and is associated with the code. For instance, a user may create a channel for "Social Media Portal (SMP)—Photos" which contains Facebook® and Flickr®. Future uploads to this channel will automatically upload photos to Facebook® and Flickr®. If the user creates a channel called "SMP—My Tweets" which points to Twitter® and Facebook®, future status updates to this channel will automatically broadcast the status update to Twitter® and Facebook®.

Figure 4:
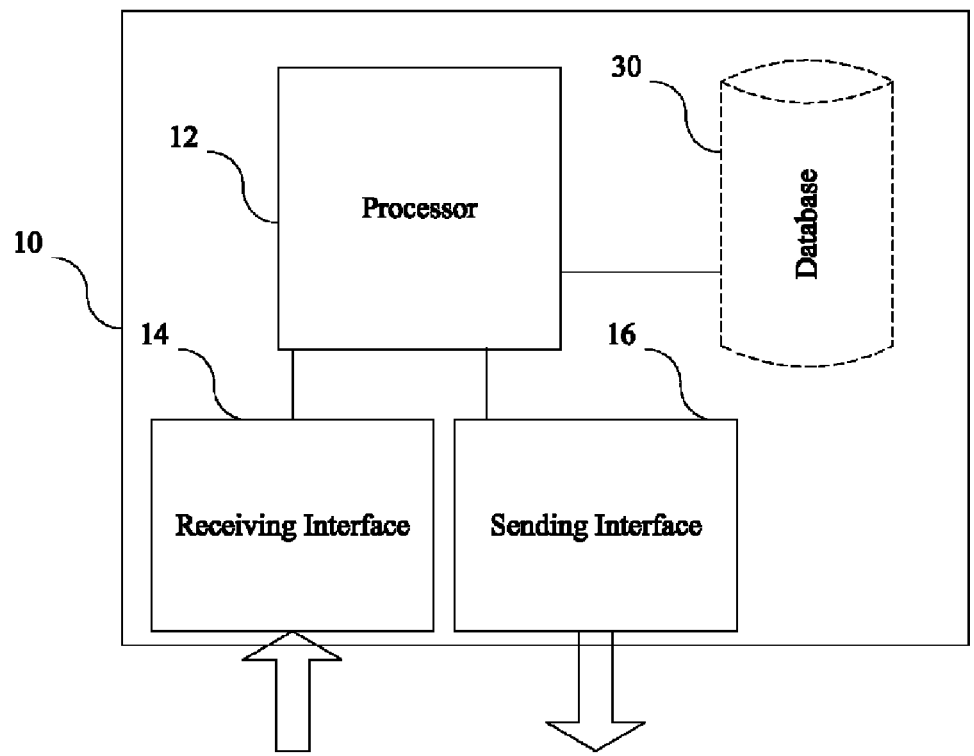
FIG. 4 is a block diagram illustrating an exemplary network node according to the invention.
Figure 5:
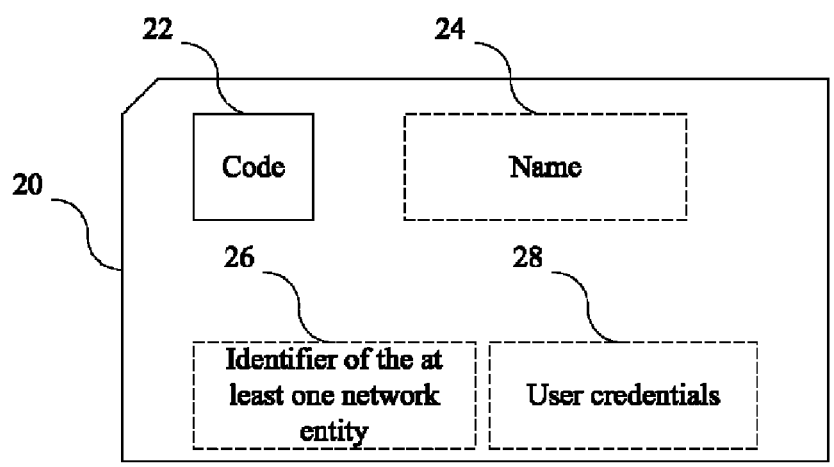
FIG. 5 is a block diagram illustrating an exemplary address book object according to the invention.

Referring now to FIGS. 1, 4 and 5, the method also comprises a step of sending an address book object 20 from the network node 10 to the user device, said address book object 20 comprising the code 22 and said address book object 20 being usable for sending a multimedia message to the network node from the user device, step 102. The network node 10 sends an address book object 20, such as a vCard to the user device, such as a mobile phone. The address book object 20 contains a code 22, preferably a short code and may contain a name 24, the channel name, for easy identification by the user. The name 24 identifies the channel created previously. When short codes are used, these are usually requested from and provided by an operator. An address book object 20, such as a vCard is basically a personal contact card which is saved into the contact list of a user device such as a mobile phone or a computer. It usually comprises a name 24 such as "SMP—Photo Uploads" and a code 22 which may be a phone number or, in the present case, a short code such as Mobile: 27394. A user may have as many address book object 20, such as vCards, as necessary on his user device, each comprising a unique code 22 and name 24.

Referring more specifically to FIG. 5, the name 24 may be representative of one of the following groups: a social network or a plurality of social networks or a web site or a plurality of web sites or a theme such as picture, audio content, status, news, article or comment, or a user identification such as a name or a nickname, etc. Furthermore, the address book object may optionally further comprise user credentials 28 for the at least one network entity 26 associated with the code 22. In such a case, the credentials may be sent with the multimedia message when the address book object 20 is used for sending a multimedia message to the network node 10.

Referring to FIGS. 1, 4 and 5, the method further comprises the step of receiving, in the network node 10, the multimedia message from the user device, said multimedia message containing the code 22 and the media content, step 104. The method further comprises updating, from the network node 10, the at least one network entity associated with the code with the media content, step 106.

For example, after taking a photo or video on a mobile phone, a user may click "Send" and select a vCard for sending the photo or video. The vCard may be one of the address book objects 20 described above. The photo may then be routed through a telecom operator network, via a Multimedia Messaging Service (MMS), to the network node 10. The network node 10 then processes the MMS, for instance, and determines which social networking sites the user vCard points to, and performs the broadcast. The photo is then available in each social networking site for which there was an identifier associated to the address book object.

In another example, after writing a text message on a mobile phone, a user clicks "Send", and selects a vCard. The text message may then be routed through a telecom operator network, via SMS, to the network node 10. The network node 10 then processes the SMS, determines which social networking sites the user vCard points to, and performs the broadcast. The text message is then uploaded as a status update in each social networking site.

By sending a content item using a vCard, the Mobile Subscriber Integrated Services Digital Network (ISDN) Number (MSISDN) of the sender, the code 22, which may be a short code, and content are automatically populated into the message. The user simply has to click "Send". Upon identification of the user device with its MSISDN, for example, it is the short code which identifies the actions which the network node 10 may take when it receives the content of the message.

Figures 6, 7:
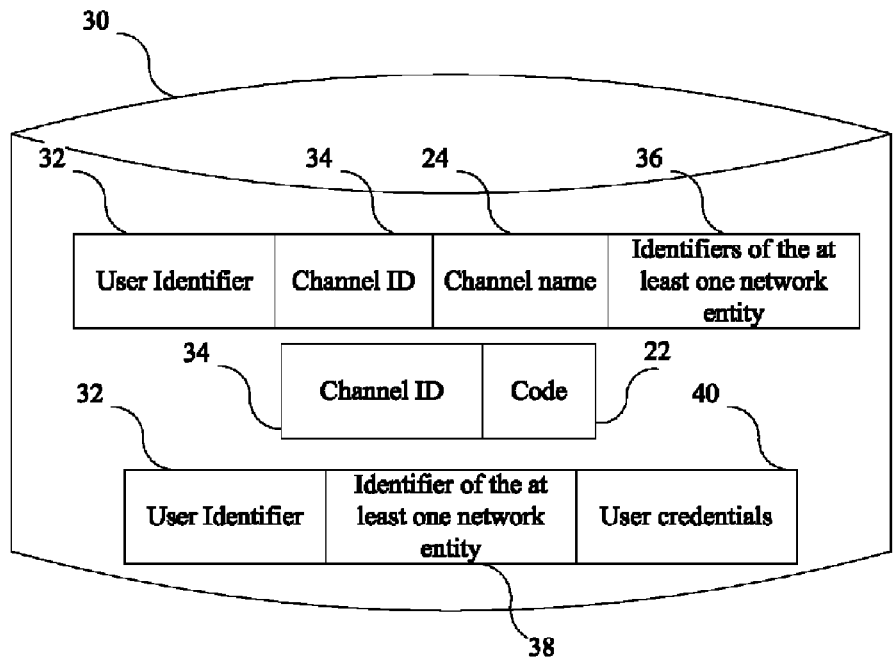
FIG. 6 is a block diagram illustrating an exemplary database according to the invention.
FIG. 7 illustrates an exemplary content of a simplified database according to the invention.

Referring now to FIGS. 4 and 6, the network node 10 may store in a database 30 a user identifier 32 corresponding to the user device and the code 22 and an identifier of the at least one network entity associated with the code 36. The database may further store user credentials 40 for the at least one network entity 36. It has to be understood that for one user identifier 32, a network entity 36 may be associated with a plurality of codes 22 in the database. Furthermore, a code 22 may be associated with a plurality of network entities 36.

Upon successful channel creation, such as explained in the example above, the channel targets i.e. the network entities 36, are preferably stored into the database 30 with the user identifier 32, such as the MSISDN, and the code 22, such as a short code, as keys.

Figure 2:
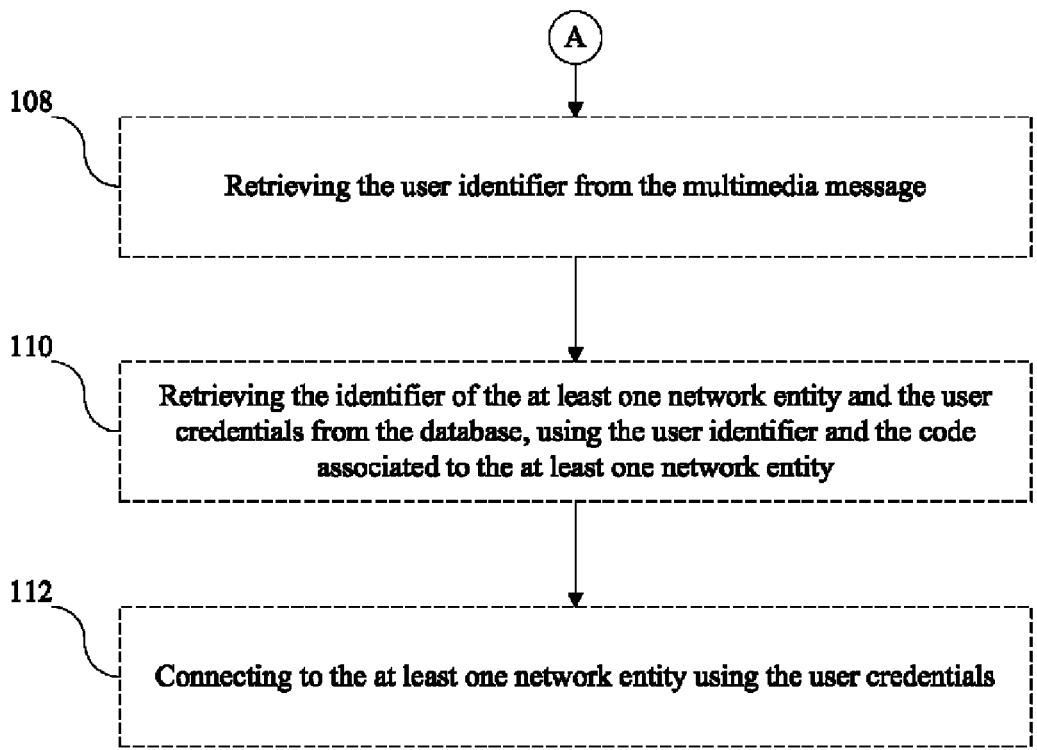
FIG. 2 is a flowchart illustrating additional steps of the method of FIG. 1.

Referring now to FIG. 2, the method may further comprise, before step 106, the steps of retrieving the user identifier from the multimedia message, step 108. The method may further comprise the step of retrieving the identifier of the at least one network entity 36 and the user credentials from the database 30, using the user identifier 32 and the code 22 associated to the at least one network entity, step 110. The method may further comprise the step of connecting to the at least one network entity using the user credentials, step 112.

In an exemplary method, the vCard is used to automatically provide the user identifier 32 such as MSISDN and a code 22 such as a short code in the SMS/MMS message. The automatically populated short code, routes the content to network node 10 with no user interaction. When the network node 10 receives an SMS or MMS from the mobile handset, it parses the message. The network node 10 reads the user identifier 32 here the mobile MSISDN, the code 22, here a short code and the body of the message. A lookup is performed in the database 30 to find the channel associated with the MSISDN and the short code. The identifier of the network entities 36 and user credentials 40 are extracted from the database using the channel ID 34, a login is performed to the associated network entities, in this example, the social networking sites and the broadcast to the set of sites is performed.

Referring more specifically to FIG. 6, the lookup to find the channel ID 34 associated with the user identifier 32 or MSISDN and the code 22, here a short code is done as follows. A channel table is kept to map channel ID 34 to the code 22. Note that the codes 22 or short codes used are the same and are reused for all users, as more specifically shown in FIG. 7. When a message is sent to the network node 10, via a short code, the first lookup that is performed is to get the channel ID 34 from the short code.

A user-channel table is kept to map user identifiers 32 and channel ID 34 to the user-specific settings, i.e. the channel name 24, and the identifiers of the at least one network entities 36. After the previous lookup is performed to get the channel ID 34, a lookup is performed in the user table to find the user identifier 32 for the MSISDN. The channel ID 34 and user identifier 32 are then used to get the list of network entities 36 to send the content to.

A supplementary table may contain, for each user identifier 32, the list of all the identifiers of network entities 38 with corresponding credentials 40. Of course, the database model of FIG. 6 is only exemplary and many variants would be within the scope of this invention, as it would be apparent to a person in the art.

FIG. 7 shows a simplified variant of a database 31, with user identifiers associated to one or many codes, each code being associated with at least one identifier of a network entity and each network entity and further comprising, for each network entity the user credentials for user to login and make updates. Many alternative embodiments of this database could be contemplated.

In an alternate exemplary embodiment of the method according to the invention, a subset of the network entities to be updated may be specified in a subject or body of the multimedia message. In such a case, the databases 30 and 31 would not necessarily contain the identifiers of the at least one network entity 36 and the associated user credentials may be submitted by the user in another manner such as in the message, using the address book object 20 of FIG. 5, wherein the identifier of the at least one network entity 26 and user credentials 28 are present in the address book object 20 and inserted in the message therefrom.

Figure 3:
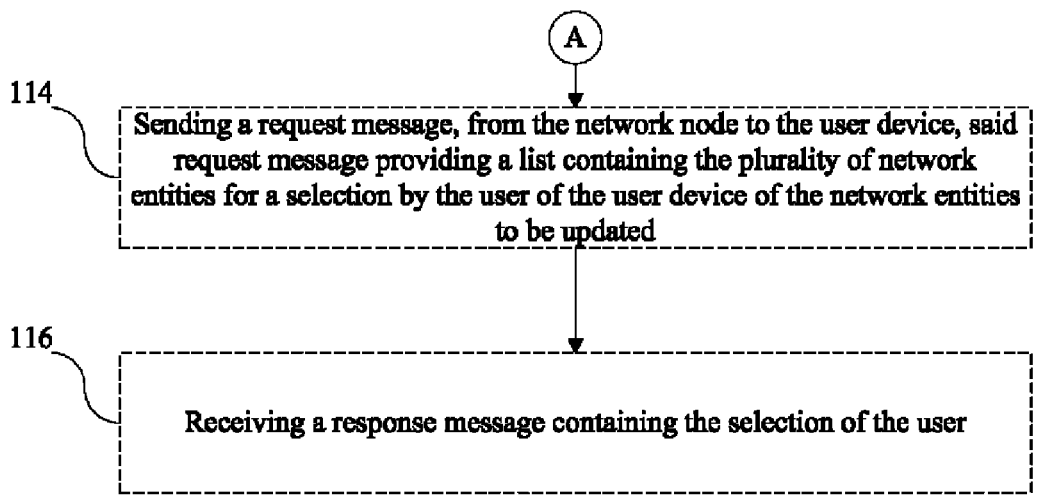
FIG. 3 is another flowchart illustrating additional steps of the method of FIG. 1.

In yet another alternate embodiment of the invention, as illustrated in FIG. 3, the method, may further comprise, before step 106, the steps of sending a request message from the network node to the user device, said request message providing a list containing the plurality of network entities for a selection by the user of the user device of the network entities to be updated, step 114, and receiving a response message containing the selection of the user, step 116. For example, a user may use a single code for updating all the social networks for which he has an account, specifying each time a subset of social networks to be updated. A user may also use several codes, as described previously and still confirm, with this alternate method, which social networks should be updated.

Referring now to FIG. 4, a network node 10 for uploading media content from a user device to at least one network entity, comprises a processor 12 for associating a code with the at least one network entity. The network node further comprises a sending interface 16, in communication with the user device, for sending an address book object to the user device, said address book object comprising the code and said address book object being usable for sending a multimedia message to the network node from the user device. The network node further comprises a receiving interface 14, in communication with the user device, for receiving the multimedia message from the user device, the multimedia message containing the code and the media content. The processor further updates, through the receiving and sending interfaces 14, 16 the at least one network entity associated with the code with the media content. The network node 10 is adapted to execute the methods described above.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

The invention claimed is:

1. A method for uploading media content from a user device to at least one social networking platform, comprising the steps of:

associating a code with the at least one social networking platform, in a network node;

sending an address book object from the network node to the user device, the address book object including the code and a name identifying the at least one social networking platform, and the address book object being usable for sending a multimedia message to the network node from the user device;

receiving, in the network node, the multimedia message from the user device, the multimedia message including the code and the media content;

determining a user identifier corresponding to the user device in accordance with the received multimedia message;

retrieving, from a database accessible by the network node, an identifier of the at least one social networking platform and user credentials in accordance with the determined user identifier and the code of the received multimedia message;

connecting to the at least one social networking platform using the user credentials; and updating the at least one social networking platform associated with the code with the media content;

wherein the address book object is one of a vCard or a personal contact card; and wherein the code is one of a short code or a Mobile Station International Subscriber Directory Number (MSISDN).

2. The method of claim 1, wherein the name identifying the at least one social networking platform is representative of one of the following groups: a social network or a plurality of social networks or a web site or a plurality of web sites or a theme such as picture, audio content, status, news, article or comment, or a user identification such as a name or a nickname.

3. The method of claim 1, wherein, for one user identifier, a social networking platform is associated with a plurality of codes in the database.

4. The method of claim 1, wherein the code is associated with a plurality of social networking platforms.

5. A network node for uploading media content from a user device to at least one social networking platform, comprising:

a processor for associating a code with the at least one social networking platform;

a sending interface, in communication with the user device, for sending an address book object to the user device, the address book object including the code and a name identifying the at least one social networking platform, the address book object being usable for sending a multimedia message to the network node from the user device;

a database for storing a user identifier corresponding to the user device, the code, an identifier of the at least one social networking platform associated with the code, and user credentials associated with the at least one social networking platform network entity; and a receiving interface, in communication with the user device, for receiving the multimedia message from the user device, the multimedia message containing the code and the media content;

wherein the processor determines the user identifier from the multimedia message, retrieves the identifier of the at least one social networking platform and the user credentials from the database in accordance with the user identifier and the code, connects to the at least one social networking platform using the user credentials, and updates, through the receiving and sending interfaces, the at least one social networking platform associated with the code with the media content;

wherein the address book object is one of a vCard or a personal contact card; and wherein the code is one of a short code or a Mobile Station International Subscriber Directory Number (MSISDN).

6. The network node of claim 5, wherein the name identifying the at least one social networking platform is representative of one of the following groups: a social network or a plurality of social networks or a web site or a plurality of web sites or a theme such as picture, audio content, status, news, article or comment, or a user identification such as a name or a nickname.

7. The network node of claim 5, wherein, for one user identifier, a social networking platform is associated with a plurality of codes in the database.

8. The network node of claim 5, wherein the code is associated with a plurality of social networking platforms.

9. The method of claim 1, wherein the user identifier is determined in accordance with the Mobile Station International Subscriber Directory Number (MSISDN) associated with the user device.

10. The method of claim 1, further comprising the steps of:

sending a request to the user device providing a list of a plurality of social networking platforms for selection; and receiving a response from the user device indicating selected social networking platforms.

* * * * *